No. 12,267. REISSUED SEPT. 20, 1904.
H. A. L. BARRY.
MEANS FOR DISCHARGING MATERIALS FROM BUCKETS.
APPLICATION FILED JULY 25, 1904.
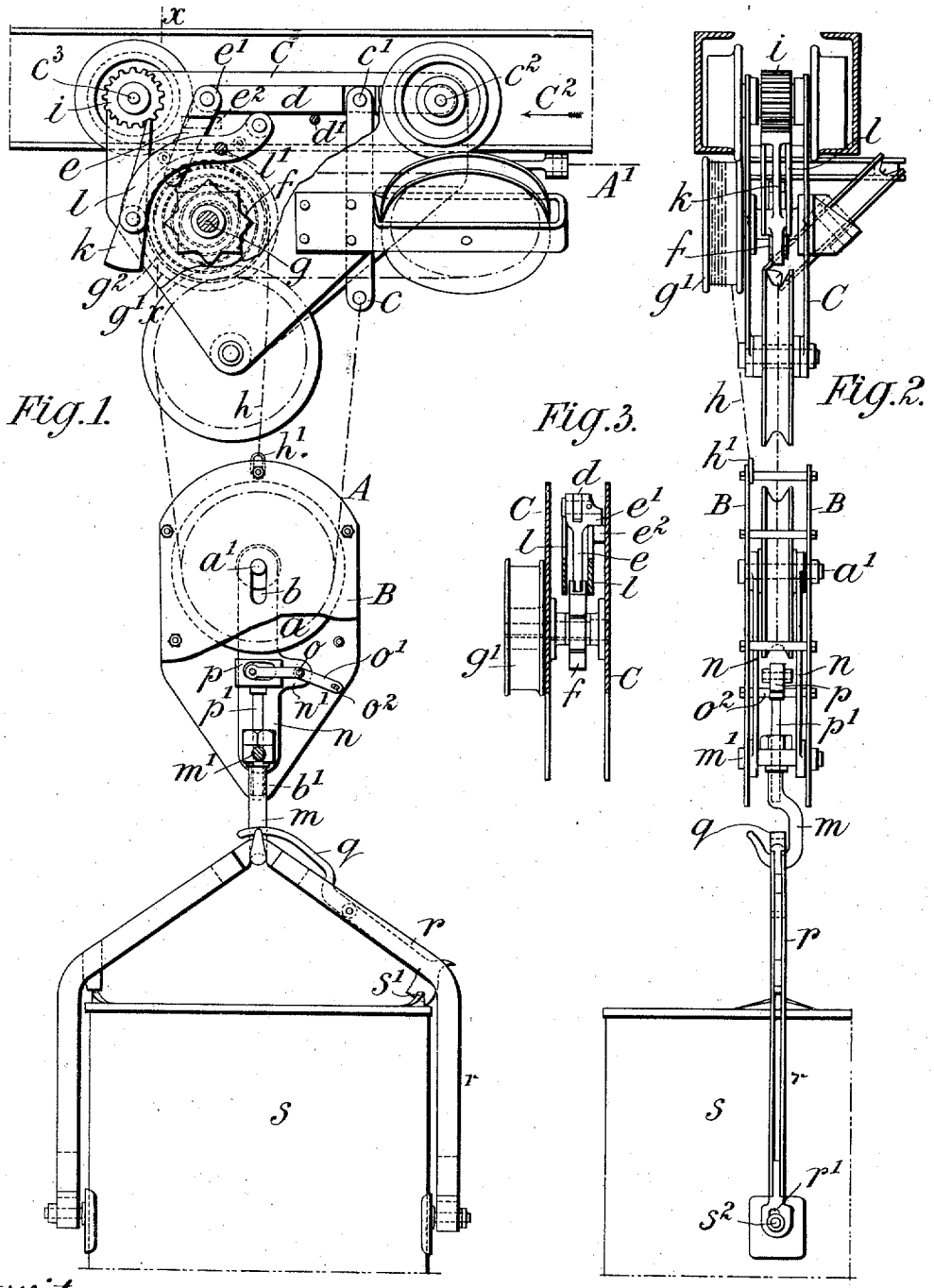
Witnesses:
Edwin L. Yewell
W. C. Peck
Inventor
Herbert Alfred Lucas Barry
By W. E. Schroeder Attorney
PHOTO-LITHOGRAPHED BY SACKETT & WILHELMS LITHO. & PTG. CO. NEW YORK.

No. 12,267. Reissued September 20, 1904.

UNITED STATES PATENT OFFICE.

HERBERT ALFRED LUCAS BARRY, OF WESTMINSTER, ENGLAND.

MEANS FOR DISCHARGING MATERIALS FROM BUCKETS.

SPECIFICATION forming part of Reissued Letters Patent No. 12,267, dated September 20, 1904.

Original No. 702,912, dated June 24, 1902. Application for reissue filed July 25, 1904. Serial No. 218,017.

*To all whom it may concern:*

Be it known that I, HERBERT ALFRED LUCAS BARRY, a subject of the King of Great Britain and Ireland, residing at 15 Great George street, in the city of Westminster, England, have invented certain new and useful Improved Means Applicable for use in Dumping or Discharging Materials from Buckets, of which the following is a specification.

This invention relates to means for dumping or discharging the loaded bucket or similar receptacle, and particularly, though not exclusively, applicable for use with transporting apparatus of the character described in the specification forming part of my United States Letters Patent, No. 712,476, of November 4, 1902, the objects of my present invention being to simplify the construction of such apparatus and to render the same more certain in operation.

In the accompanying drawings, Figure 1 is a side elevation of the improved dumping mechanism, a portion of the carriage-framing, as also a portion of the side plate of the return or fall block, being broken away in order to expose the internal mechanism. Fig. 2 is a corresponding end view. Fig. 3 is a transverse section taken along the line $x\,x$ in Fig. 1.

Dumping mechanism constructed according to my improved method comprises a pulley $a$, mounted rotatively in slots $b$ in the side plates B of the return or fall block, around which the rope A, pertaining to the load, passes on its way to the carriage C. This rope is attached to a pendent arm $c$, which is connected, by means of a hinge-pin $c'$, with a bar $d$, one end of the latter being arranged to pivot about the wheel-axle $c^2$, pertaining to the carriage, while the other end carries a pawl $e$. The free end of this pawl when in a certain position engages with a cam or star wheel $f$, which is fast on the shaft $g$ of a drum $g'$, wherein is coiled a spring $g^2$. About this drum is wound a rope $h$, whereof one end is secured to the said drum $g'$, the other end being attached by a shackle $h'$ to the casing B of the fall-block. This rope is maintained in tension by means of the coiled spring $g^2$ within the drum $g'$. The pawl $e$ is formed with a lateral projection $e'$, which upon engaging with a stop $e^2$ on the frame of the carriage holds the pawl clear of the cam-wheel $f$. The downward movement of the bar $d$ is limited by means of a pin $d'$, which projects from the side of the carriage-framing. The load-rope A being secured to the lower end of the pendent arm $c$, a given downward pull is effected on the bar $d$, according to the weight of the load. Upon the other wheel-axle, $c^3$, pertaining to the carriage, is secured a toothed wheel $i$, and arranged to engage therewith is a pawl $k$, so weighted that it has a constant tendency to assume a vertical position. This pawl $k$ is pivoted at one end of a lever $l$, the latter being fulcrumed on a pin $l'$ in the side frame of the carriage, the other end of the said lever bearing against the inner side of the bar $d$. In the return or fall block are mounted the sheave or pulley $a$, around which the rope A, pertaining to the load, is passed, and a hook $m$, same being connected by side bars $n\,n$. The trunnions $a'$ of the sheave or pulley, as also the steadying-pins $m'$ of the hook, are housed in the respective slots $b$ and $b'$ of the casing, so that the said casing B of the fall-block is free to move vertically to a certain extent. The side bars $n\,n$ are provided with lateral extensions $n'$, in which is mounted the pivot $o$ of a lever $o'$, whereof one end is hinged by a pin $o^2$ to the casing-plates B and the other end is engaged with the cross-head $p$, pertaining to a plunger $p'$, which passes through the hollow shank of the hook $m$. The lower end of the plunger $p'$ is immediately above the free end of the trigger $q$, which is carried by the bridle $r$ of the dumping-bucket $s$. The other end of the trigger $q$ is weighted and is arranged to engage in a catch $s'$ on the bucket. The trunnions $s^2$ of the bucket are carried in slots $r'$ in the lower extremity of each arm of the bridle $r$. Thus when the pull is exerted in the act of elevating the loaded bucket the bridle $r$ is first raised, whereby the trunnions $s^2$ occupy the bottom of the slots $r'$, and at the same time the trigger $q$ is set by being caused to vibrate about its pivot $q'$, with the effect that its free end moves upward toward the plunger $p'$, the trigger being thus set in the position for firing automatically as the result of the upward movement of the bridle $r$.

The accidental displacement of the trigger is hereby obviated while the bucket is on the ground and before being raised, the arrangement of the trigger being such as to render any vibratory movement thereof nugatory.

Assuming the bucket to be loaded and raised and the carriage run forward in the direction of the arrow C*, for example, the raising of the block B will permit the coiling of the rope $h$ upon the spring-actuated drum $g'$, and in traveling forward the toothed wheel $i$ on the carriage will have carried the weighted pawl $k$ to the one side of such wheel, so that the bar $d$ rests upon the stop-pin $d'$, the pawl $e$ carried by the said bar being held free of the cam-wheel $f$, owing to the projection $e'$ thereon engaging with the stop $e^2$ on the carriage-framing. So long as the carriage C remains stationary the load may be lowered and raised as often as required, no pull beyond that incidental to the tension of the spring $g^2$ being exerted on the rope $h$ because the pawl $e$ cannot engage with the cam-wheel $f$. If while lowering the load the carriage be moved slightly backward by hauling on the rope A', the movement of the toothed wheel $i$ is reversed and by engaging with the weighted pawl $k$ depresses the latter as also that end of the lever $l$ whereby it is carried, the other end of this lever being at the same time raised and in turn slightly raising the bar $d$. During the rising of the bar $d$ the pawl $e$ is lifted free of the stop $e^2$, thus allowing the pawl to swing into engagement with the cam-wheel $f$ until it rests against the pivot $l'$ of the lever $l$. As the lowering of the load proceeds and the revolving of the spring-actuated drum $g'$ effects the paying out of the rope $h$ the cam-wheel $f$ must pass beneath the end of the pawl. To do this, a greater tension must be exerted on the rope $h$, attached to the block-casing, than can be given by the weight of the casing B itself, because the bar $d$ is held down by the load. Thus the cam-wheel $f$ temporarily checks the spring-actuated drum $g'$ and the paying out of the rope $h$, with the result that the return or fall block casing B apparently remains behind, while the rope-wheel $a$, together with the side bars $n$ and hook $m$, moves by the trunnions $a'$ and pins $m'$, pertaining, respectively, to the wheel $a$ and hook $m$, along the slots $b$ and $b'$ until the trunnions $a'$ and pins $m'$ reach the bottom of their respective slots $b$ and $b'$. The whole load now exerts a pull on the rope $h$ sufficient to rotate the cam-wheel $f$ and to force the pawl $e$, together with the bar $d$, upward, allowing the cam-wheel $f$ to pass. The arresting the downward movement of the fall-block casing B being equivalent to raising the outer end of the lever $o'$, it follows that upon the vibration of the lever $o'$ the cross-head $p$ and plunger $p'$ become depressed, the latter forcing down the adjacent end of the trigger $q$ and allowing the bucket to discharge its load. The releasing of the trigger and the dumping of the bucket are incidental to a combined backward movement of the carriage and a downward movement of the load. By hauling the carriage back during the lowering of the load the motion of the wheel $i$ is reversed, its teeth engage the weighted pawl $k$ and take it to the opposite side of the wheel $i$, the bar $d$ is raised, and the pawl $e$ engaged with the cam-wheel $f$, arresting the motion of the latter, and consequently stopping the paying out of the rope $h$. The rope $h$ being thus rendered stationary, the downward movement of the fall-block casing is arrested, with the effect that the end of the lever $o'$ where it is hinged to the plates is also rendered stationary; but the inner end of the lever by acting upon the plunger causes the latter to depress the trigger $q$, and thereby to effect the release of the bucket. For dumping the bucket the backward movement may be imparted to the carriage at any point during the lowering of the load. The weight of the block and load is borne by the rope A. The function of the spring $g^2$ is to permit the rewinding of the rope $h$ about the drum $g'$ upon the raising of the load, but not to lift the plates B of the fall-block casing. The normal position of the fall-block casing is shown in the drawings. It is only when the downward movement of this casing is arrested that the trunnions $a'$ occupy the lower ends of the slots $b$.

By means of the improved gear the load can be lifted and lowered and traveled backward and forward as often as may be without dumping; but when required by combining a backward movement of the carriage with a downward movement of the load the latter may be dumped. This can be done at any point on the track and at any desired level. It will be seen that the dumping can always be effected by changing the direction of travel of the carriage during the act of lowering the load; but in practice I prefer to arrange the apparatus so that the carriage must run forward first, thereby clearing the men who have loaded the bucket and obviating the risk of accident to them in the event of an oversight occurring on the part of the driver.

What I claim as my invention, and desire to secure by Letters Patent, is—

1. In apparatus for transporting and discharging materials, a dumping-block wherein a plunger passing through the shank of the hook operates a trigger-lever carried by the bridle of the bucket to release the latter, substantially as herein described.

2. In apparatus for transporting and discharging materials, dumping mechanism comprising a pulley in the return-block and a hook, the same being connected together and adapted to move vertically in relation to the block-casing, a plunger in mechanical connection with said casing, a tension-rope, a spring-actuated drum for receiving said rope, a cam or star wheel, a pawl carried by a bar pivoted on one of the carriage-wheel axles and to which the load-rope is connected, a toothed wheel on the other carriage-wheel axle, and a pawl and a lever adapted to be operated by said toothed wheel, substantially as herein described.

3. In apparatus for transporting and discharging materials, a return-block having slotted side plates which carry the pulley pertaining to the load-rope and the hook which supports the bucket, and a rope held in tension and adapted to support the block-casing, substantially as and for the purpose specified.

4. In apparatus for transporting and discharging materials, the combination, with the load-rope A, of the pulley *a*, slotted plates B, carriage C, bar *d*, pawl *e*, cam or star wheel *f*, spring *g*, drum *g'*, tension-rope *h*, toothed wheel *i*, pawl *k*, lever *l*, connecting-bars *n*, lever *o'*, cross-head *p* and plunger *p'*, arranged and operating substantially as and for the purposes set forth.

5. In apparatus for transporting and discharging materials, the combination, with a plunger operated by the return-block casing, of a trigger-lever *q*, catch *s'* and a bridle *r* having slots *r'* for the bucket-trunnions $s^2$, substantially as and for the purposes set forth.

6. In a conveyer provided with a load-rope and a hauling-rope, the herein-described means for dumping consisting in a fall-block casing having a vertical movement relatively to its contained sheave and a firing-pin adapted to trip the trigger the operation of the firing mechanism being dependent on a vertical movement of the block and a horizontal movement of the carriage having taken place concurrently.

7. In a conveyer, the combination, with a carriage fall-block and hoisting and traction ropes and a bucket and its trigger, of means effecting a vertical movement of the fall-block casing relatively to its contained sheave and its load, and means, operated by such movement, to trip the trigger and discharge the load, as set forth.

8. In a conveyer, the combination, with a carriage, fall-block and hoisting and traction ropes, and a bucket and its trigger, of a firing-pin movable relatively to the block, and means, operated by a vertical movement of the block concurrently with a horizontal movement of the carriage, to actuate the trigger and dump the load, as set forth.

In testimony whereof I have signed my name to this specification in the presence of two subscribing witnesses.

HERBERT ALFRED LUCAS BARRY.

Witnesses:

WM. O. BROWN,

PERCY E. MATTOCKS.